US012747817B2

(12) United States Patent
Leitel et al.

(10) Patent No.: US 12,747,817 B2
(45) Date of Patent: Sep. 29, 2026

(54) METHOD FOR FITTING A MEASURING DEVICE ON A TUBE

(71) Applicant: Siemens Mobility GmbH, Munich (DE)

(72) Inventors: Holger Leitel, Pullach (DE); Holger Schnebbe, Tönisvorst (DE)

(73) Assignee: Siemens Mobility GmbH, Munich (DE)

( * ) Notice: Subject to any disclaimer, the term of this patent is extended or adjusted under 35 U.S.C. 154(b) by 291 days.

(21) Appl. No.: 18/577,729

(22) PCT Filed: Jun. 24, 2022

(86) PCT No.: PCT/EP2022/067338
§ 371 (c)(1),
(2) Date: Jan. 9, 2024

(87) PCT Pub. No.: WO2023/280595
PCT Pub. Date: Jan. 12, 2023

(65) Prior Publication Data
US 2024/0318758 A1 Sep. 26, 2024

(30) Foreign Application Priority Data
Jul. 9, 2021 (DE) ..................... 10 2021 207 261.5

(51) Int. Cl.
*F16L 41/00* (2006.01)
*B21J 5/06* (2006.01)
*G01L 19/00* (2006.01)

(52) U.S. Cl.
CPC ............. *F16L 41/008* (2013.01); *B21J 5/066* (2013.01); *G01L 19/0007* (2013.01)

(58) Field of Classification Search
None
See application file for complete search history.

(56) References Cited

U.S. PATENT DOCUMENTS 2,991,551 A 7/1961 Fogle et al.
3,178,944 A 4/1965 Templeton
4,175,413 A * 11/1979 van Geffen .............. B21J 5/066 72/71
4,577,511 A * 3/1986 Wetzel .................... G01M 3/26 73/431
5,708,210 A * 1/1998 Gardellin ............ G01L 19/0645 73/756
5,971,001 A 10/1999 Anderson
6,848,438 B2 2/2005 Celerier et al.
(Continued)

FOREIGN PATENT DOCUMENTS

CN 102152800 B * 6/2013
DE 4224131 A1 1/1994
(Continued)

*Primary Examiner* — Daniel S Larkin
(74) *Attorney, Agent, or Firm* — Laurence A. Greenberg; Werner H. Stemer; Ralph E. Locher

(57) ABSTRACT

A method for retrofitting a measuring facility on a tube of a fluid line of a vehicle, in particular a rail vehicle, includes using a non-cutting friction drilling process in the vehicle for creating a hole in the tube by melting the material of the tube. The measuring device is connected at the hole created by melting. A rail vehicle with a fluid line, for instance in a freight car, is also provided.

12 Claims, 8 Drawing Sheets

(56) References Cited

U.S. PATENT DOCUMENTS

| | | | |
|---|---|---|---|
| 11,268,643 | B2 | 3/2022 | Sato |
| 2003/0010017 | A1 | 1/2003 | Myers et al. |

FOREIGN PATENT DOCUMENTS

| | | | |
|---|---|---|---|
| DE | 60014192 | T2 | 10/2005 |
| DE | 102011018748 | B3 | 7/2012 |
| DE | 102012108481 | A1 | 3/2014 |
| DE | 112019001107 | T5 | 11/2020 |
| WO | WO 9845584 | A1 | 10/1998 |

* cited by examiner

METHOD FOR FITTING A MEASURING DEVICE ON A TUBE

CROSS REFERENCE TO RELATED APPLICATION

This application is a 35 USC § 371 National Stage filing of International Application PCT/EP2022/067338, filed Jun. 24, 2022, which designated the United States, this application also claims the priority, under 35 U.S.C. 119, of German Patent Application DE 10 2021 207 261.5, filed Jul. 9, 2021; the prior applications are herewith incorporated by reference in their entirety.

FIELD AND BACKGROUND OF THE INVENTION

The invention relates to a method for retrofitting a measuring facility on a tube of a fluid line of a vehicle, in particular a rail vehicle.

In the field of rail vehicle technology, in particular in relation to goods wagons, the problem arises of retrofitting rail vehicles which are already built or put into service with air pressure measuring facilities for monitoring the air pressure of the compressed air braking system. In this regard, the restricted available space for the operation steps to be carried out is problematic, as is the safety consideration that a contamination of the compressed air line or of the compressed air braking system must be avoided in any event.

SUMMARY OF THE INVENTION

It is an object of the invention to provide a method for retrofitting a measuring facility on a tube of a fluid line of a vehicle, said method being capable of being carried out with little cost and rapidly, but nevertheless without putting the existing infrastructure at risk.

This object is achieved according to the invention with a method having the features described below. Advantageous embodiments of the method according to the invention are disclosed in the subclaims.

Thus it is Provided according to the invention that in the vehicle, a hole is melted into the tube with a non-cutting friction drilling process by melting the material of the tube and the measuring facility is connected to the melted-in hole.

A significant advantage of the method according to the invention lies therein that it dispenses with drilling into the fluid line since instead thereof, a melting-on or melting-in of a hole is undertaken. A melting-in in place of a drilling has the great advantage that no chips are created which could fall into the interior of the tube of the fluid line and could impair the whole fluid system or even render it inoperative. The latter aspect plays a part, in particular, if, when the hole is created, the fluid line itself is not under pressure, so that particles would readily fall into the fluid line if this were not prevented with a targeted precaution.

It is advantageous if, firstly, a pipe boring clamp is mounted on the tube situated in the vehicle and the friction drilling process is carried out at the site defined by the pipe boring clamp.

The fluid line is preferably a compressed air line of the vehicle and the hole is preferably melted into the compressed air line.

The fluid line preferably involves a compressed air line of a compressed air braking system of the vehicle. An air pressure measuring facility is preferably connected to the tube as a measuring facility which, during operation, measures the air pressure of the compressed air braking system.

The non-cut-ting friction drilling process is preferably performed with a transportable routing machine in that said machine is operated at a rotary speed of over 10,000 rotations per minute. A rotary speed of 30,000 rotations per minute (1-10%) is regarded as particularly advantageous for the non-cutting friction drilling process.

During operation, the routing machine is preferably pressed onto the tube exclusively manually (with manual pressing force), without any additional pressing facility.

An adapter facility is preferably arranged between the transportable routing machine and the pipe boring sleeve, in particular if an opening in the pipe boring clamp alone cannot ensure adequate guidance for the routing machine.

In a preferred embodiment of the method, it is provided that the adapter facility is mounted on the transportable routing machine forming a routing machine adapter unit and the routing machine adapter unit is placed on the pipe boring clamp, in particular its fastening screws.

In the latter variant, iris advantageous if the adapter facility is mounted on the transportable routing machine forming the routing machine adapter unit by feeding screws through holes in the adapter facility and screwing them into the routing machine.

In another preferred embodiment of the method, it is provided that the adapter facility is placed on the pipe boring clamp, in particular on an attachment connecting piece of the pipe boring clamp or is inserted into an opening of the pipe boring clamp, in particular in an attachment connecting piece of the pipe boring clamp, before the routing machine is placed onto the adapter facility.

The pipe boring clamp preferably has a tubular attachment connecting piece onto which the adapter facility is placed.

The central axis or the longitudinal direction of the tubular attachment connecting piece preferably extends radially outwardly, particularly preferably such that the rotation axis of the router head can be oriented coaxially with the central axis of the tubular attachment connecting piece.

The inner wall of the tubular attachment connecting piece is preferably provided with an internal thread which enables a screwing-in of a component such as, for example, the measuring facility.

The attachment connecting piece preferably has a dual function: firstly, with its outer wall, it can serve for placing and orienting the routing machine, and secondly it can be utilized with its inner wall for receiving or mounting the measuring facility.

The measuring facility is preferably connected, in particular screwed, to the inner wall of the attachment connecting piece.

The adapter facility preferably has a through hole, the inner contour of which fits the outer contour or the outer wall of the attachment connecting piece of the pipe boring clamp and ensures a centering of the adapter facility on the attachment connecting piece and thereby of the router bead of the routing machine within the opening of the attachment connecting piece.

In a particularly advantageous variant of the method, it is provided that h pipe boring clamp has a tubular attachment connecting piece with an outer wall and an inner wall, the adapter facility is placed on the attachment connecting piece and is therein centered by the outer wall of the attachment connecting piece, therein or thereafter the router head is fed through the attachment connecting piece and is placed on the tube and the hole is subsequently melted in and, following the melting-in of the bole, the measuring facility is screwed into an internal thread in the inner wall of the tubular attachment connecting piece.

The melting of the tube material is preferably carried out in the unpressurized state of the tube.

The tube is preferably a metal tube.

The melting of the tube material is preferably carried out in a goods wagon, for example, in the context of modernization works for adapting the goods wagon to new standards.

The invention further relates to a rail vehicle with a fluid line. According to the invention, it is provided that the fluid line has a tube with a melted-in hole and a measuring facility is connected to the melted-in hole.

With regard to the advantages of the rail vehicle according to the invention and advantageous embodiments of the rail vehicle according to the invention, reference should be made to the embodiments above in relation to the method according to the invention and its advantageous embodiments.

It is advantageous if the measuring facility is screwed into a tubular attachment connecting piece of a pipe boring clamp, the outer wall of which forms an adjusting facility for a centered placement of a routing machine, an adapter facility and/or a routing machine adapter unit.

The invention will now be described in greater detail by reference to exemplary embodiments; in the drawings, by way of example.

DETAILED DESCRIPTION OF THE INVENTION

Figure 1:
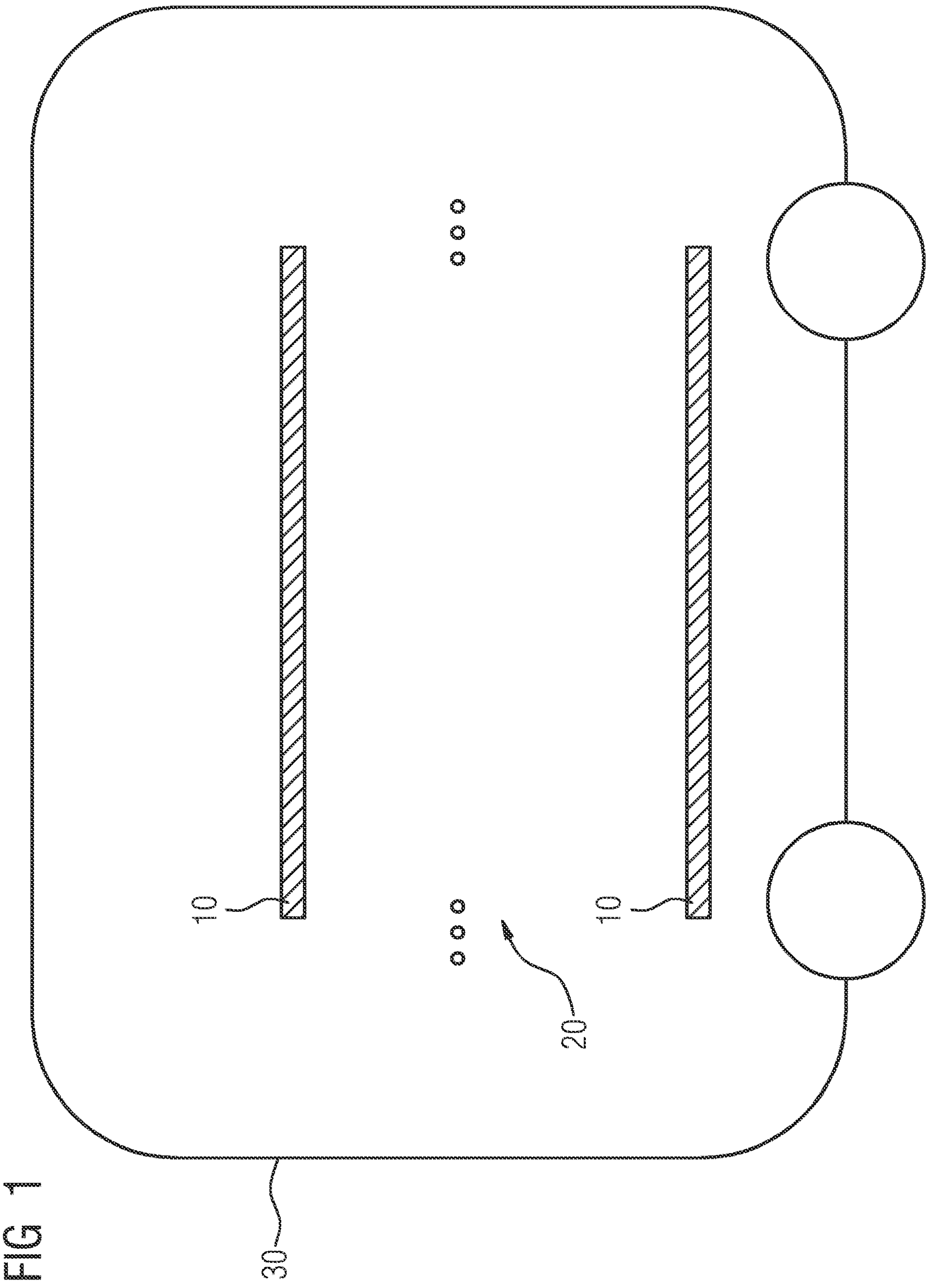
FIG. 1 shows an exemplary embodiment of a rail vehicle in the form of a goods wagon that is equipped with a compressed air braking system, in a schematic representation, not to scale.

For the sake of clarity, in the drawings, the same reference signs are always used for identical or similar components.

FIG. 1 shows, in a schematic representation not to scale, a portion of a tube of a compressed air line 10 which forms a component part of a compressed air braking system 20 which is merely indicated and not shown in detail. The compressed air braking system 20 is installed in a rail vehicle 30 which can be, for example, a goods wagon.

In relation to FIGS. 2 to 7, it will now be described, by way of example, how the compressed air braking system 20 can be retrofitted in the unpressurized state, that is in the non-operating state of the rail vehicle, with an additional air pressure measuring facility. Therein, it is to be prevented that during the retrofitting process, impurities, in particular tube material of the compressed air line 10, fall into the interior of the compressed air line 10, due to abrasion or splinter formation, and damage the compressed air braking system 20 or possibly even render it completely inoperative.

Figure 2:
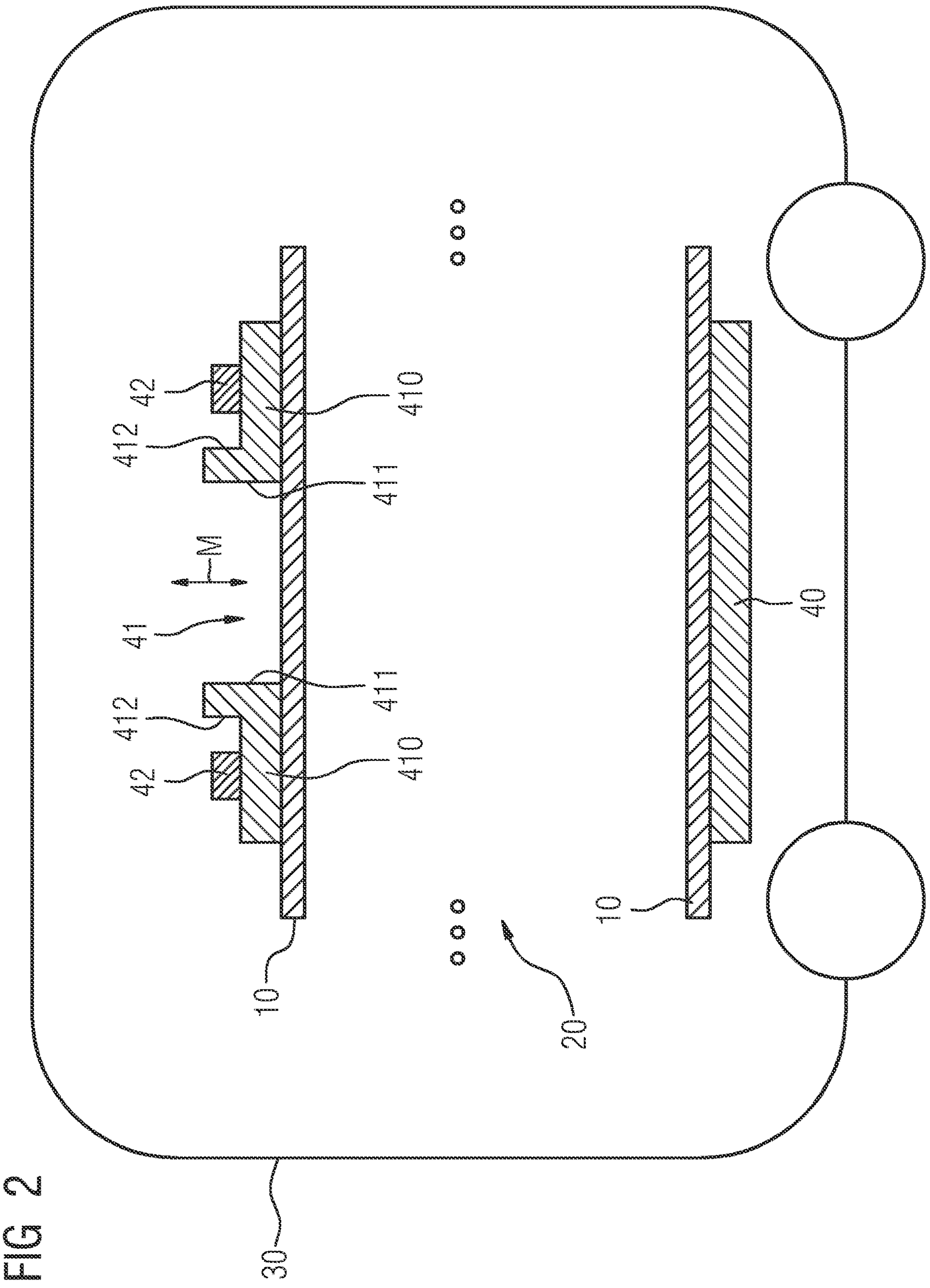
FIGS. 2 to 6 show method steps for retrofitting the compressed air braking system of the goods wagon according to FIG. 1 in the unpressurized state with the aid of a routing machine placed on a pipe boring clamp by means of an adapter facility.

Initially, in a first method step with the aid of, for example, four fastening screws 42, a pipe boring clamp 40 is installed on the compressed air line 10, as shown, for example, in cross-section in FIG. 2.

The pipe boring clamp 40 according to FIG. 2 has a clamp portion 400 which abuts the compressed air line 10 and is preferably sealed with a seal (not shown) relative to the compressed air line 10.

Furthermore, the pipe boring clamp 40 according to FIG. 2 has a clamp portion in the form of a tubular attachment connecting piece 410. The central axis M or the longitudinal direction of the tubular attachment connecting piece 410 extends radially outwardly.

An inner wall 411 of the tubular attachment connecting piece 410 is provided with an internal thread (not shown in detail) which enables a screwing-in of a component such as, for example, a measuring facility.

The tubular attachment connecting piece 410 forms an opening 41 which leaves a partial portion of the compressed air line 10 free and enables a placement of a tube machining device on the compressed air line 10.

Figure 3:
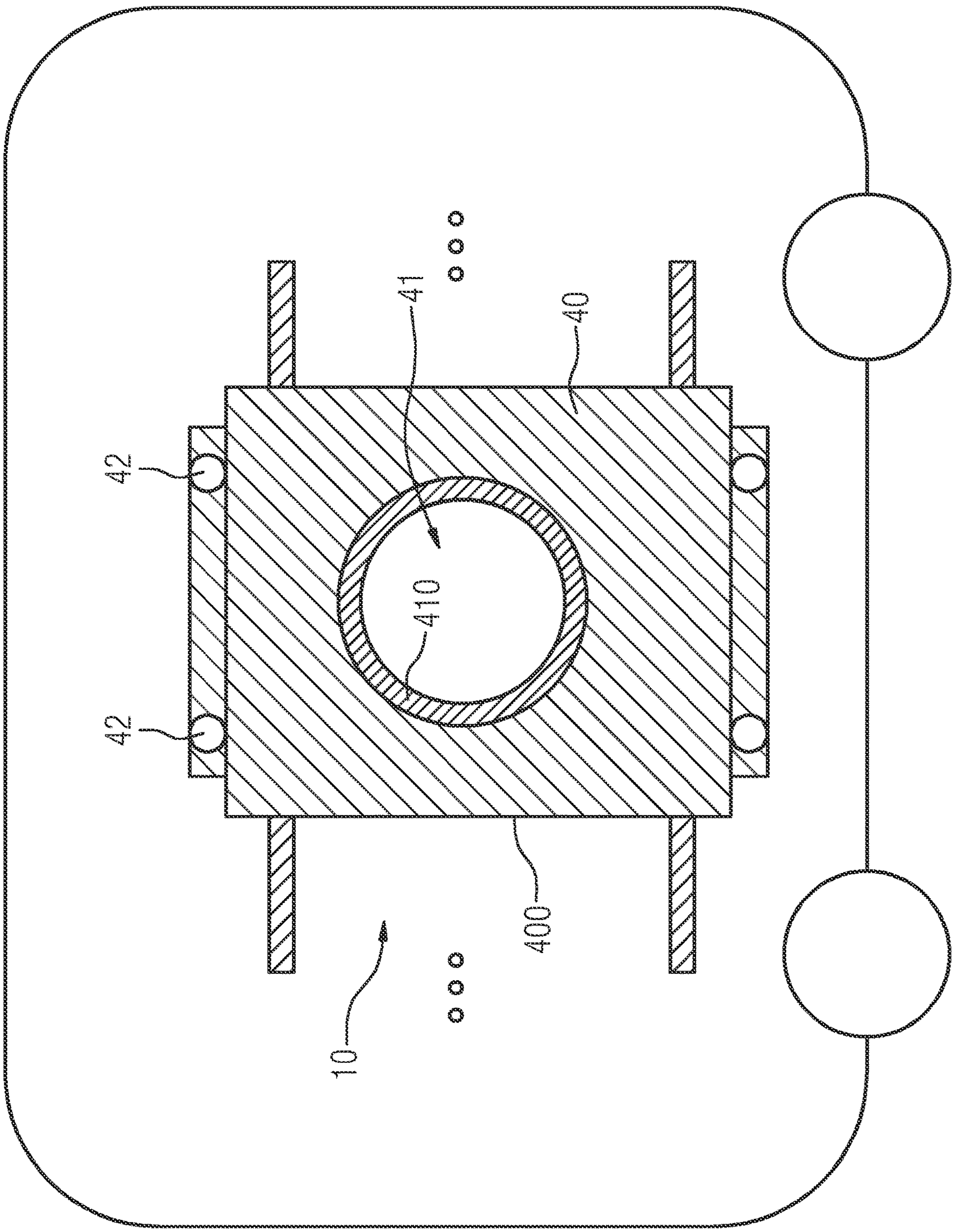

FIG. 3 shows the pipe boring clamp 40 with the opening 41 in a plan view from above: here also, it is evident that a material machining device can be placed on the opening 41 in order to introduce a hole into the tube of the compressed air line 10. Furthermore, the fastening screws 42 are shown, which permit a fastening of the pipe boring clamp 40 to the compressed air line 10.

Figure 4:
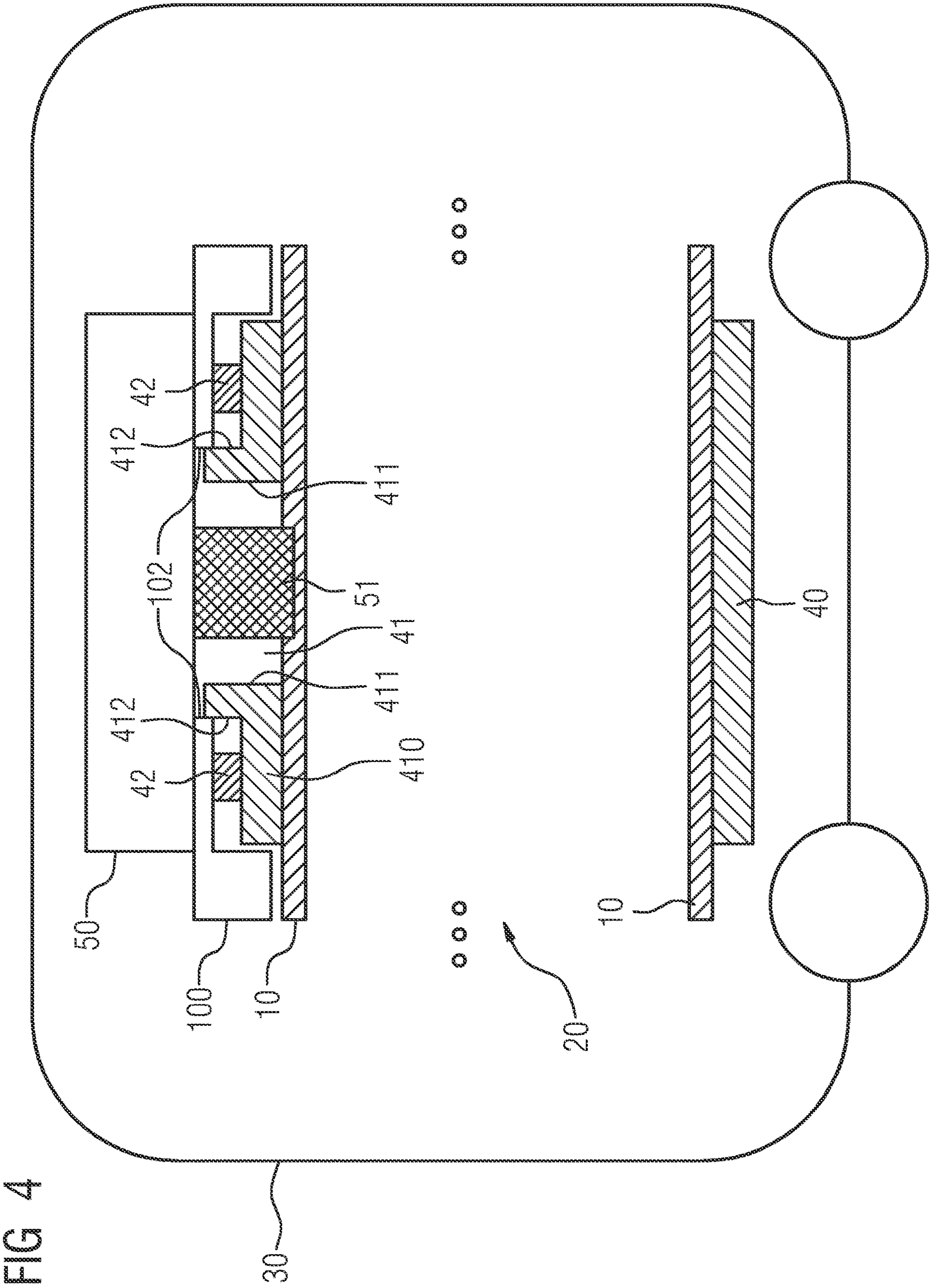

FIG. 4 shows the compressed air line 10 and the pipe boring clamp 40 again in a cross-section after an adapter facility 100 and, as the material machining device, a transportable routing machine 50 has been manually placed on the pipe boring clamp 40 such that its router head 51 lies directly on the compressed air line 10.

The adapter facility 100 is preferably firmly connected, for example screwed, to the routing machine 50 before the placement on the pipe boring clamp 40 in order to form a pre-assembled routing machine adapter unit.

It can be seen in FIG. 4 that a through hole 102 of the adapter facility 100 abuts the outer wall 412 of the attachment connecting piece 410 and so centers the routing machine adapter unit in the opening 41 or relative to the attachment connecting piece 410. At the same time, the adapter facility 100 provides, by way of its abutment on the four fastening screws 42 for a perpendicular or at least approximately perpendicular routing process.

If the transportable routing machine 50 is put into operation and operated at a rotary speed of over 10,000 rotations per minute, preferably at a rotary speed of over 30,000 rotations per minute, then with only light manual pressing force—as was discovered by the inventors—its router head 51 will create no chips and, in the case of a compressed air line 10 made of metal as is commonly used in the field of railway technology for compressed air lines, will not introduce a chip-laden bore hole into the compressed air line 10, but will rather melt and thereby displace the tube material of the compressed air line 10, whereby a melted-in hole 60 is formed in the compressed air line 10.

Figure 5:
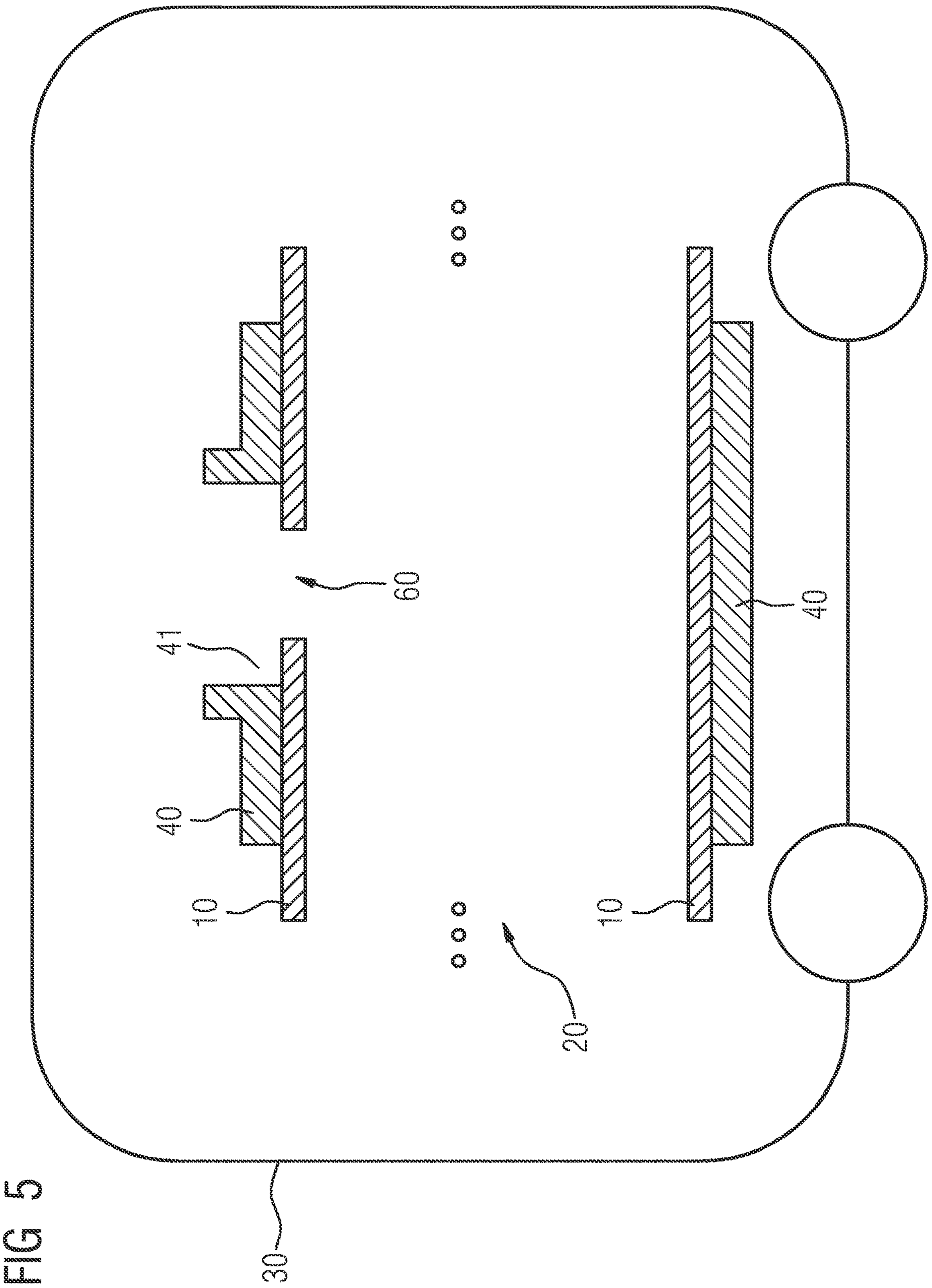

FIG. 5 shows the compressed air line 10 after the melted-in hole 60 has been created by means of the transportable routing machine 50, according to FIG. 4.

Following the melting-in of the hole 60, an air pressure measuring facility 70 is inserted into the attachment connecting piece 410 (see FIG. 6) by screwing it with its external thread (not shown in detail) into the aforementioned internal thread (also not shown in detail) in the inner wall 411 of the tubular attachment connecting piece 410.

Figure 6:
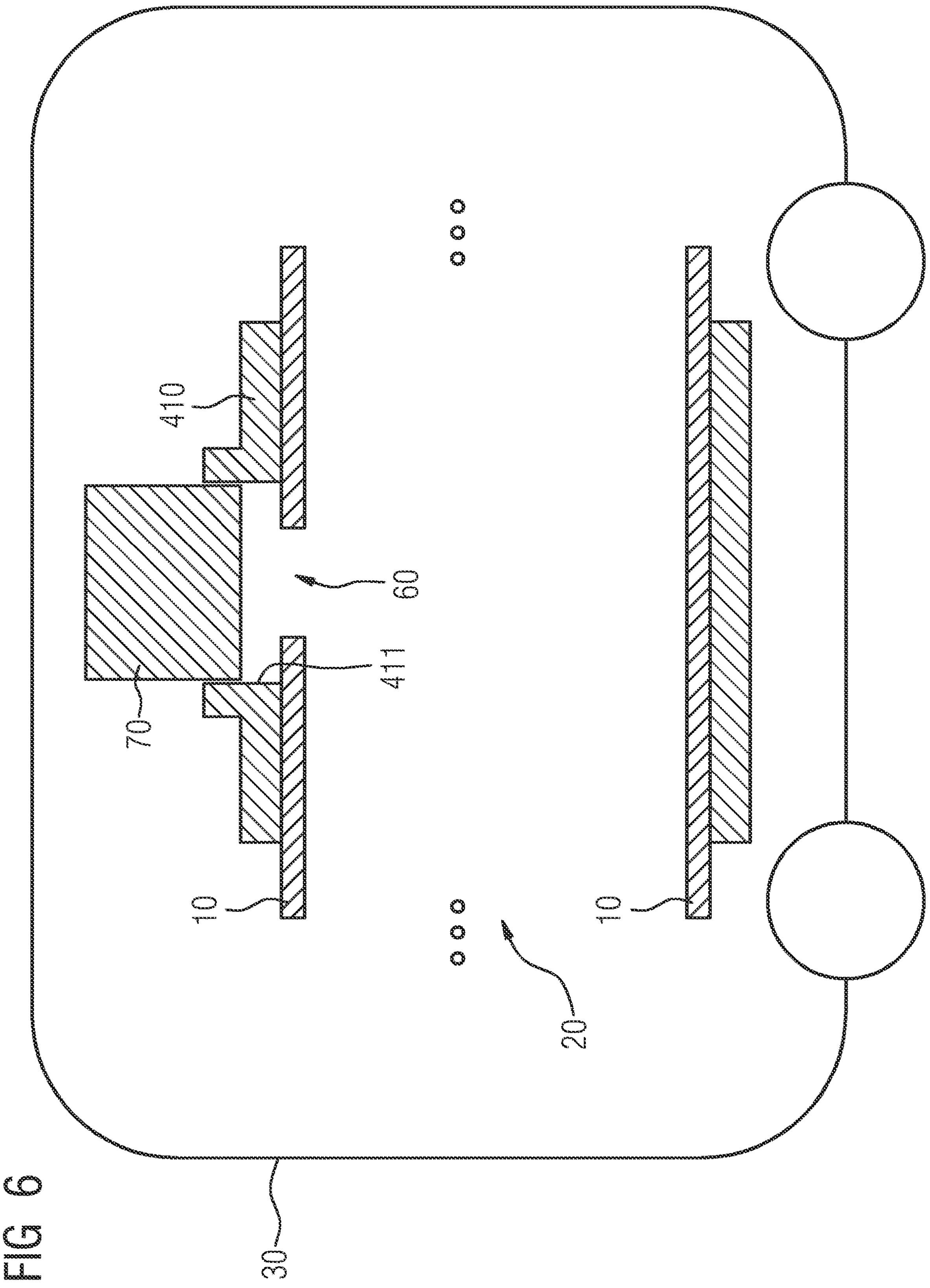

It can be seen that the attachment connecting piece 410 advantageously performs a double function: it serves both for placement and orientation of the adapter facility 100 or of the routing machine adapter unit as has been explained in relation to FIGS. 2 to 4, and also for receiving or mounting the measuring facility 70 by way of screwing to the inner wall 411 as has been explained in relation to FIG. 6.

Figure 7:
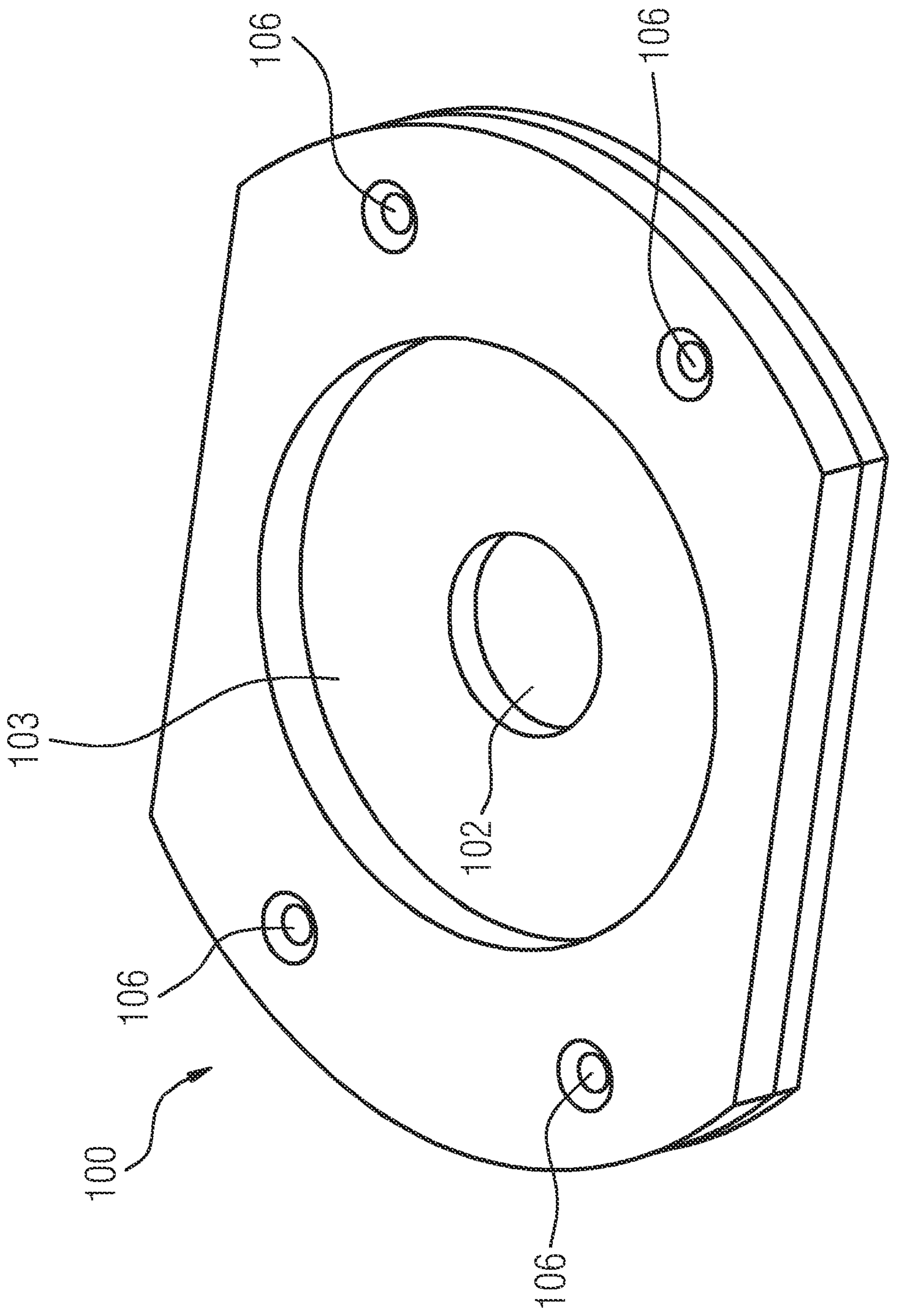
FIG. 7 shows an exemplary embodiment of a preferred embodiment of an adapter facility for the method according to FIGS. 2 to 6 in a three-dimensional representation obliquely, from the side.

FIG. 7 shows in greater detail an exemplary embodiment for the adapter facility 100 which preferably has holes 106 matched to a base plate of the routing machine 50, said holes enabling a screwing-on of the adapter facility 100 on the base plate of the routing machine 50 and thus the formation of a routing machine adapter unit before it is placed together on the attachment connecting piece 410. The through hole 102, in a recess 103, in particular, is evident, which serves for centering or orienting the adapter facility 100 on the attachment connecting piece 410 of the pipe boring clamp 40.

Figure 8:
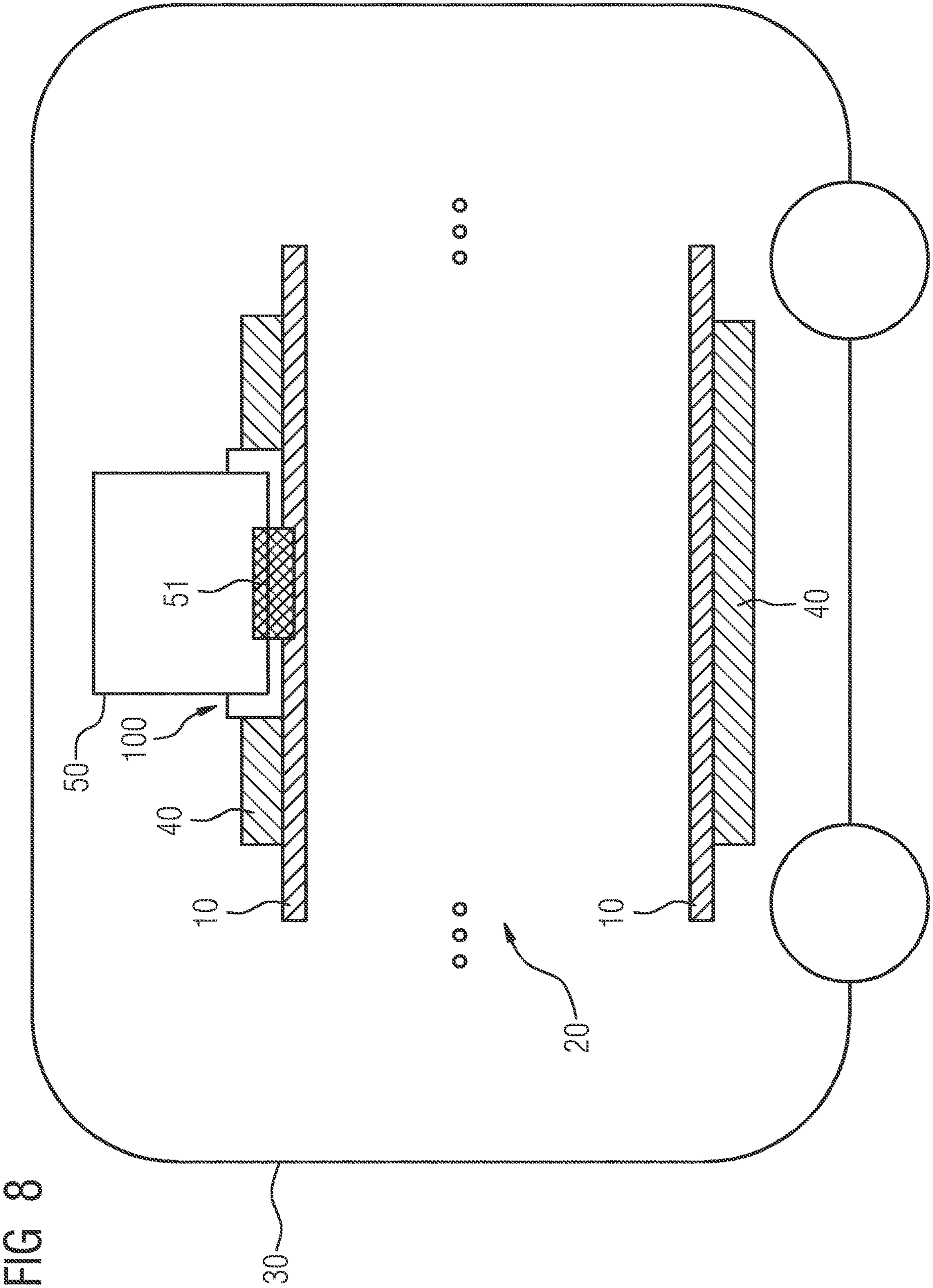
FIG. 8 shows an exemplary embodiment of a method, in which an adapter facility is placed into, that is, not placed onto, the pipe boring clamp.

In the exemplary embodiment according to FIGS. 2 to 7, the adapter facility 100 is oriented, on the outer wall 412 of the attachment connecting piece 410, to the pipe boring clamp 40. If the diameter of the opening 41 of the pipe boring clamp 40 is large enough that a front part of the routing machine 50 can protrude into it, then an adapter facility 100 can also be inserted into the opening 41 of the pipe boring clamp 40 so that its outer contour is oriented to the inner wall of the opening 41. An alternative embodiment of this type is shown by way of example in FIG. 8.

Although the invention has been illustrated and described in detail by way of exemplary embodiments, the invention is not restricted by the examples given and other variations can be derived therefrom by a person skilled in the art, without departing from the protective scope of the invention.

REFERENCE SIGNS

10 Compressed air line
20 Compressed air braking system
30 Rail vehicle
40 Pipe boring clamp
41 Opening
42 Fastening screws
50 Routing machine
51 Router head
60 Melted-in hole
70 Air pressure measuring facility
100 Adapter facility
102 Through hole for centering
103 Recess
106 Fastening holes
400 Clamp portion
410 Attachment connecting piece
411 Inner wall
412 Outer wall
M Central axis

The invention claimed is:

1. A method for retrofitting a measuring facility on a tube of a fluid line of a vehicle or a rail vehicle, the method comprising:

melting a hole into the tube with a non-cutting friction drilling process by melting material of the tube in the vehicle using a routing machine;

placing an adapter facility between the routing machine and a pipe boring clamp;

mounting the adapter facility on the routing machine forming a routing machine adapter unit by feeding screws through holes in the adapter facility and screwing the screws into the routing machine;

placing the routing machine adapter unit on the pipe boring clamp; and connecting the measuring facility at the melted-in hole.

2. The method according to claim 1, which further comprises initially mounting a pipe boring clamp at a site on the tube situated in the vehicle, and carrying out the friction drilling process at the site defined by the pipe boring clamp.

3. The method according to claim 1, which further comprises melting the hole into a compressed air line of the vehicle as the fluid line.

4. The method according to claim 1, which further comprises:

providing a compressed air line of a compressed air braking system of the vehicle as the fluid line; and connecting an air pressure measuring facility to the tube as the measuring facility for measuring an air pressure of a compressed air braking system during operation.

5. The method according to claim 1, which further comprises carrying out the non-cutting friction drilling process with the routing machine being a transportable routing machine while operating the transportable routing machine in a rotary speed range of between 10,000 and 33,000 revolutions per minute.

6. The method according to claim 5, which further comprises pressing the transportable routing machine onto the tube during operation exclusively manually without any additional pressing facility.

7. The method according to claim 1, which further comprises:

placing the adapter facility at an opening of the pipe boring clamp;

subsequently placing the routing machine being a transportable routing machine, on the adapter facility; and guiding a router head of the transportable routing machine through a through hole in the adapter facility.

8. The method according to claim 1, which further comprises:

providing the pipe boring clamp with a tubular attachment connecting piece having an outer wall and an inner wall;

placing the adapter facility or the routing machine adapter unit on the tubular attachment connecting piece and centering the adapter facility or the routing machine adapter unit on the tubular attachment connecting piece by way of the outer wall of the attachment connecting piece; and after the melting-in of the hole, screwing the measuring facility into an internal thread in the inner wall of the tubular attachment connecting piece.

9. The method according to claim 1, which further comprises:

providing the tube as a metal tube; and carrying out the melting of the tube material in a freight car.

10. The method according to claim 1, which further comprises carrying out the melting of the tube material in an unpressurized state of the tube.

11. A rail vehicle, comprising:

a fluid line having a tube with a melted-in hole formed therein; and a measuring facility connected at said melted-in hole according to claim 1.

12. The rail vehicle according to claim 11, which further comprises:

a pipe boring clamp having a tubular attachment connecting piece with an outer wall forming an adjusting facility for a centered placement of at least one of a routing machine, an adapter facility or a routing machine adapter unit;

said measuring facility being screwed into said tubular attachment connecting piece.

* * * * *